(12) United States Patent
Yamazaki et al.

(10) Patent No.: US 10,746,083 B2
(45) Date of Patent: Aug. 18, 2020

(54) VEHICULAR COOLING DEVICE

(71) Applicant: DENSO CORPORATION, Kariya, Aichi-pref. (JP)

(72) Inventors: Eisaku Yamazaki, Kariya (JP); Ken Muto, Kariya (JP); Yuji Nishimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 91 days.

(21) Appl. No.: 16/191,638

(22) Filed: Nov. 15, 2018

(65) Prior Publication Data

US 2019/0085751 A1    Mar. 21, 2019

Related U.S. Application Data

(63) Continuation of application No. PCT/JP2017/017970, filed on May 12, 2017.

(30) Foreign Application Priority Data

May 18, 2016   (JP) .................................. 2016-099507

(51) Int. Cl.
*B60H 1/00* (2006.01)
*F01P 3/18* (2006.01)
(Continued)

(52) U.S. Cl.
CPC .................. *F01P 3/18* (2013.01); *F01P 7/16* (2013.01); *F01P 11/08* (2013.01); *F16H 57/04* (2013.01);
(Continued)

(58) Field of Classification Search
CPC ...... F01P 3/18; F01P 7/16; F01P 11/08; F01P 2050/24; F01P 2060/045; F01P 2070/04;
(Continued)

(56) References Cited

U.S. PATENT DOCUMENTS 9,587,532 B1 * 3/2017 Au .............................. F01P 5/10
2004/0226764 A1 * 11/2004 Iwasaki ..................... F01P 3/20
180/68.1
(Continued)

FOREIGN PATENT DOCUMENTS

JP    2007-016857 A   1/2007
JP    2008138829 A    6/2008
(Continued)

*Primary Examiner* — Davis D Hwu
(74) *Attorney, Agent, or Firm* — Harness, Dickey & Pierce, P.L.C.

(57) ABSTRACT

A vehicular cooling device includes a heat medium circuit, a waste heat supply device, a heat exchanger, and a heater. A heat medium circulates in the heat medium circuit. The waste heat supply device is configured to generate a waste heat in accordance with operation of the waste heat supply device and supply the waste heat to the heat medium. The heat exchanger is configured to exchange heat between the heat medium and a lubricant lubricating a transmission of a vehicle. The heater is configured to heat the lubricant that is inside the heat exchanger. According to this vehicular cooling device, since the heater heats the lubricant, the transmission can be warmed up early, and thereby friction in the transmission decreases to improve fuel economy.

6 Claims, 2 Drawing Sheets

(51) Int. Cl.
  *F01P 7/16*   (2006.01)
  *F16H 57/04*  (2010.01)
  *F01P 11/08*  (2006.01)
  *F25D 17/02*  (2006.01)

(52) U.S. Cl.
  CPC ....... *F16H 57/042* (2013.01); *F16H 57/0409* (2013.01); *F16H 57/0413* (2013.01); *F16H 57/0436* (2013.01); *F25D 17/02* (2013.01); *F01P 2050/24* (2013.01); *F01P 2060/045* (2013.01); *F01P 2070/04* (2013.01)

(58) Field of Classification Search
  CPC .... F16H 57/04; F16H 57/0409; F16H 7/0413; F16H 57/042; F16H 57/0436; F25D 17/02
  USPC ........................................................ 165/202
  See application file for complete search history.

(56) References Cited

U.S. PATENT DOCUMENTS

| | | | |
|---|---|---|---|
| 2010/0319638 A1* | 12/2010 | Hollweck | F01M 5/002 123/41.42 |
| 2011/0228478 A1* | 9/2011 | Takata | F16H 61/0006 361/699 |
| 2017/0022881 A1* | 1/2017 | Matsumoto | F01P 7/16 |

FOREIGN PATENT DOCUMENTS

| | | |
|---|---|---|
| JP | 2009228431 A | 10/2009 |
| JP | 2010249252 A | 11/2010 |
| JP | 2010268606 A | 11/2010 |
| JP | 2013133922 A | 7/2013 |
| JP | 2017044124 A | 3/2017 |

* cited by examiner ial Application No. PCT/JP2017/017970 filed on May 12, 2017, which designated the United States and claims the benefit of priority from Japanese Patent Application No. 2016-099507 filed on May 18, 2016. The entire disclosures of all of the above applications are incorporated herein by reference.

TECHNICAL FIELD

The present disclosure relates to a cooling device for a vehicle.

BACKGROUND ART

In recent years, the demand for low fuel consumption of automobiles is increasing more and more. Therefore, there is a growing need for early warming up technology to reduce the frictional resistance during cold by warming up the engine and the transmission early.

That is, promoting the warm-up of both the engine and the transmission leads to an improvement in fuel economy. Warming up of the engine and the transmission is performed using heat generated from the engine as a heat source.

On the other hand, as the size of the engine becomes smaller and the hybrid vehicle becomes common, the amount of heat generated from the engine is getting smaller, and the time required for warm-up tends to become longer.

SUMMARY

According to a first aspect of the present disclosure, a vehicular cooling device includes a heat medium circuit, a waste heat supply device, a heat exchanger, and a heater. A heat medium circulates in the heat medium circuit. The waste heat supply device generates waste heat in operation and supplies the waste heat to the heat medium. The heat exchanger is configured to exchange heat between the heat medium and a lubricant lubricating a transmission of a vehicle. The heater is configured to heat the lubricant that is inside the heat exchanger.

EMBODIMENTS

Figure 1:
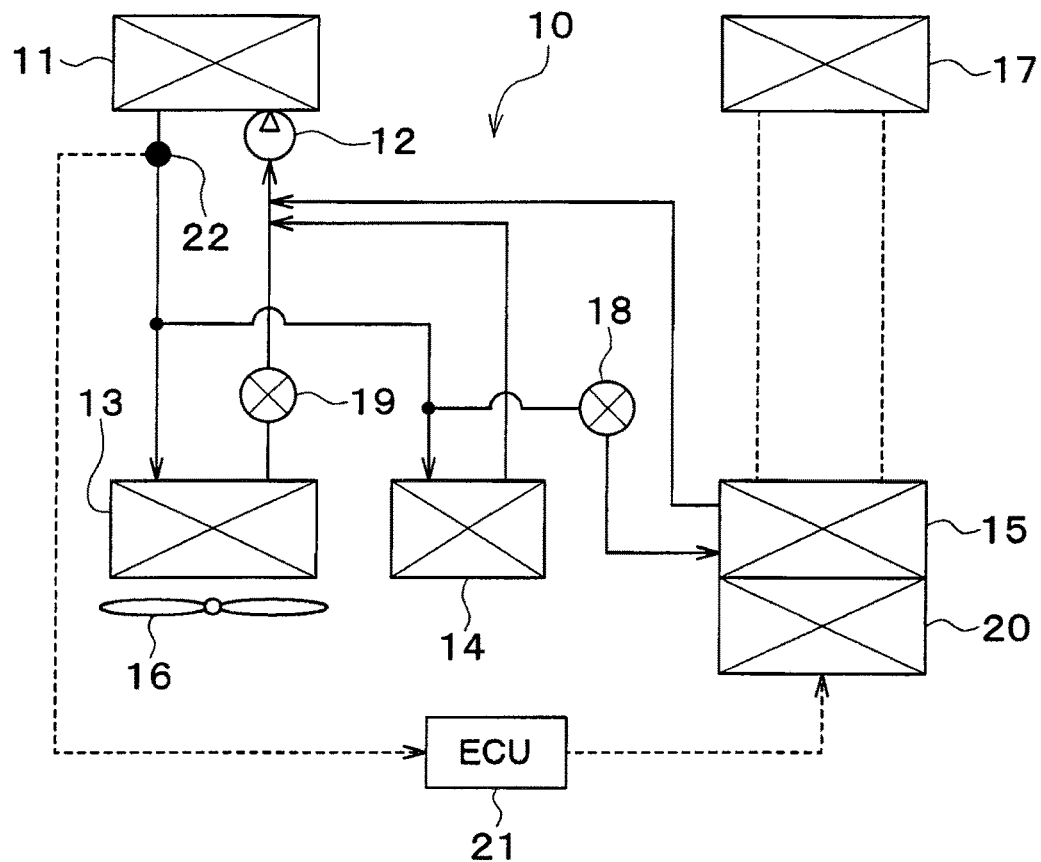
FIG. 1 is a diagram illustrating an overall configuration of a vehicular cooling device according to at least one embodiment of the present disclosure.

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The parts may be combined even if it is not explicitly described that the parts can be combined. The embodiments may be partially combined even if it is not explicitly described that the embodiments can be combined, provided there is no harm in the combination.

Hereinafter, embodiments will be described with reference to the drawings. In the following embodiments, identical or equivalent elements are denoted by the same reference numerals as each other in the figures.

First Embodiment

A vehicular cooling device shown in FIG. 1 includes an engine cooling water circuit 10. The engine cooling water circuit 10 is a cooling water circuit including a cooling water passage in which a cooling water circulates.

The cooling water is a fluid serving as a heat medium. For example, the cooling water may be a liquid containing at least ethylene glycol, dimethylpolysiloxane, or nanofluid, or may be anti-freezing liquid. The engine cooling water circuit 10 is a heat medium circuit including a heat medium passage in which a heat medium circulates.

The engine cooling water circuit 10 serves as a cooling water circuit that is configured to cool an engine 11 with the cooling water. The engine 11 is a waste heat supply device that generates waste heat during operation and supplies waste heat to the cooling water. The engine 11 is a heating target device that requires a warm-up when it is cold.

The engine cooling water circuit 10 includes the engine 11, a pump 12, a radiator 13, a heater core 14, and a CVT warmer 15.

The pump 12 is configured to draw and discharge the cooling water. The pump 12 is a belt-driven pump driven by a force generated by the engine 11 and transmitted via a belt. The pump 12 may be an electric pump.

The radiator 13 serves as a cooling water-air heat exchanger that is configured to perform a heat exchange between the cooling water and air (referred to as the outside air hereafter) from an outside of the vehicle compartment. The outside air is sent to the radiator 13 by an outdoor blower 16.

The heater core 14 is an air heating heat exchanger that is configured to perform a heat exchange between the cooling water and air supplied to the vehicle compartment thereby heating the air supplied to the vehicle compartment. The heater core 14 is a heat exchanger for heating the vehicle compartment. The air is sent to the heater core 14 by an indoor blower (not shown).

The CVT warmer 15 is a heat exchanger configured to exchange heat between the cooling water and a lubricant (i.e. CVT fluid) for a continuously variable transmission 17 (i.e. CVT). The continuously variable transmission 17 is a heating target device that requires a warming up when it is cold.

The radiator 13, the heater core 14, and the CVT warmer 15 are arranged in parallel with each other in a flow of the cooling water in the engine cooling water circuit 10.

The engine cooling water circuit 10 includes a first thermostat 18 and a second thermostat 19. The first thermostat 18 is provided in a cooling water passage connected to the CVT warmer 15. The second thermostat 19 is provided in a cooling water passage connected to the radiator 13.

The first thermostat 18 and the second thermostat 19 are cooling water temperature sensitive valves. The first thermostat 18 and the second thermostat 19 include a thermo-wax whose size varies depending on temperature, and a mechanical structure that moves a valve to open and close a cooling water passage in accordance with a volume change of the thermo-wax.

The first thermostat 18 closes the cooling water passage connected to the CVT warmer 15 to stop a flow of the cooling water toward the CVT warmer 15 when a temperature of the cooling water is lower than a first predetermined temperature (e.g. 80 degrees Celsius).

The second thermostat 19 closes the cooling water passage adjacent to the radiator 13 to block a flow of the cooling water toward the radiator 13 when a temperature of the cooling water is lower than a second predetermined temperature (e.g., 84 degrees Celsius). The second predetermined temperature is higher than the first predetermined temperature.

An electric heater 20 is coupled with the CVT warmer 15. The electric heater 20 is a heat generation portion that generates heat when electricity is supplied from a battery of a vehicle (not shown). Accordingly, the electric heater 20 can generate heat independently of an actuation of the engine.

When the electric power of the battery is insufficient, an alternator (not shown) of the vehicle supplies the electric power. The alternator is a power generator driven by the engine 11 to generate electric power.

Since the electric heater 20 generates heat, the lubricant flowing through the CVT warmer 15 can be heated. The electric heater 20 is a heating portion that heats the CVT warmer 15.

Figure 2:
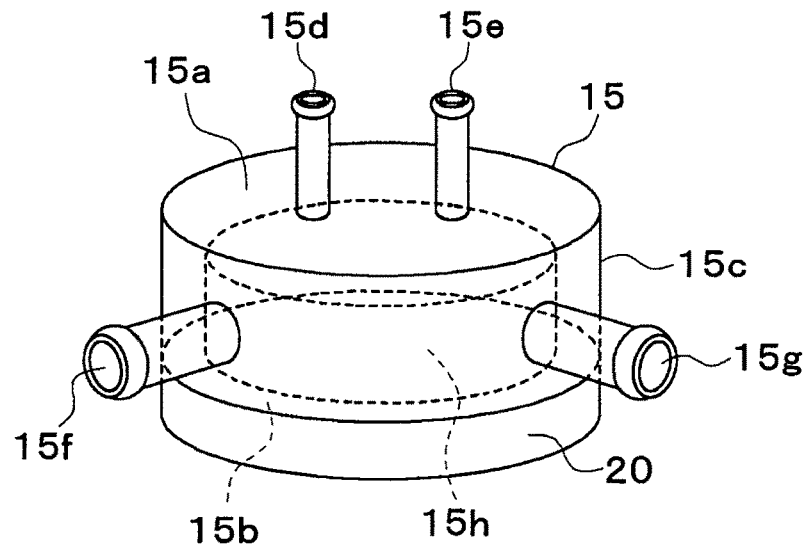
FIG. 2 is a perspective view illustrating a CVT warmer and an electric heater of the vehicular cooling device according to at least one embodiment of the present disclosure.

As shown in FIG. 2, the CVT warmer 15 has a thin circular column shape. Accordingly, the CVT warmer 15 includes an upper surface 15a having a circular shape, a bottom surface having a circular shape, and a lateral surface having a curved shape.

A lubricant inlet port 15d and a lubricant outlet port 15e are provided in the upper surface 15a. A cooling water inlet port 15g and the cooling water outlet port 15f are provided in the lateral surface 15c.

The upper surface 15a is a lubricant port surface through which the lubricant flows in and out. The lateral surface 15c is a cooling water port surface through which the cooling water flows in and out. The bottom surface 15b is a non-port surface through which the lubricant and the cooling water do not flow in and out.

The CVT warmer 15 includes therein a heat exchange portion 15h. The heat exchange portion 15h includes a lubricant passage and a cooling water passage and exchanges heat between the lubricant and the cooling water.

A clearance through which the lubricant flows is defined in the CVT warmer 15 and between the upper surface 15a and the heat exchange portion 15h. A clearance through which the cooling water flows is defined in the CVT warmer 15 and between the lateral surface 15c and the heat exchange portion 15h.

The CVT warmer 15 has no clearance between the heat exchange portion 15h and the bottom surface 15b. Accordingly, the heat exchange portion 15h is closer to the bottom surface 15b than to the upper surface 15a and the lateral surface 15c in the CVT warmer 15.

The electric heater 20 is provided on the bottom surface 15b. The electric power is supplied to the electric heater 20 to generate heat, and accordingly the bottom surface 15b of the CVT warmer 15 is heated. As a result, the lubricant in the CVT warmer 15 is heated. The electric heater 20 is provided on the bottom surface 15b.

The electric heater 20 is in contact with an entire surface of the bottom surface 15b. Accordingly, an area for heat transfer from the electric heater 20 to the CVT warmer 15 becomes large, and the lubricant is effectively heated by the electric heater 20.

In addition, since the electric heater 20 is provided on the bottom surface 15b, the electric heater 20 is close to the heat exchange portion 15h as well as possible. Accordingly, the lubricant is effectively heated by the electric heater 20.

Further, since the electric heater 20 is provided on the bottom surface 15b of the CVT warmer 15, replacement of the electric heater 20 is easy.

Next, an electric controller of the vehicular cooling device will be described. The controller 21 includes a known microcomputer including CPU, ROM, RAM and the like, and peripheral circuits. The controller 21 performs various calculations and processes based on a control program stored in the ROM when electric power is supplied from a battery (not shown).

Various control target devices are connected to an output side of the controller 21. The controller 21 is a control unit that controls the control target devices.

The control target devices controlled by the controller 21 are the pump 12, the outdoor blower 16, the electric heater 20, an indoor blower (not shown), for example.

Detection signals from sensors such as a water temperature sensor 22 are input to an input side of the controller 21. The water temperature sensor 22 is a heat medium temperature detector that is configured to detect a temperature of the cooling water in the engine cooling water circuit 10. For example, the water temperature sensor 22 detects a temperature of the cooling water flowing out of the engine 11.

The controller 21 controls the power supply to the electric heater 20 based on the temperature of the cooling water detected by the water temperature sensor 22.

Next, the operation with the above-described configuration will be described. When an ignition switch of the vehicle is turned on and the engine 11 is started, the pump 12 is actuated. As a result, the cooling water circulates in the engine cooling water circuit 10. The temperature of the cooling water is increased by the waste heat of the engine 11.

When the temperature of the cooling water is lower than the first predetermined temperature (e.g. 80 degrees Celsius), the first thermostat 18 closes the cooling passage connected to the CVT warmer 15 to stop a flow of the cooling water toward the CVT warmer 15, and the second thermostat 19 closes the cooling water passage connected to the radiator 13 to stop a flow of the cooling water toward the radiator 13.

As a result, the cooling water circulates between the engine 11 and the heater core 14. At this moment, it is preferable that the flow rate of the air passing through the heater core 14 is low. Since the cooling water does not flow through the radiator 13 and the CVT warmer 15, heat dissipation from the cooling water to the outside air does not occur in the radiator 13, and heat dissipation from the cooling water to the lubricant does not occur in the CVT warmer 15.

At this time, the controller 21 causes the battery (not shown) to supply electric power to the electric heater 20. As a result, the lubricant in the CVT warmer 15 is heated by the electric heater 20, and the continuously variable transmission 17 is warmed up.

Accordingly, the continuously variable transmission 17 can be warmed up by using electric power while the engine 11 is preferentially warmed up with heat generated by the engine during cold.

At this time, the engine controller (not shown) controls the rotational speed of the engine 11 to be high so as to quickly warm up the engine 11. Therefore, the power generation amount of the alternator (not shown) increases. Accordingly, when the electric power from the battery is insufficient, the electric power generated by the alternator can be supplied to the electric heater 20.

When the temperature of the cooling water detected by the water temperature sensor 22 is at or above the first predetermined temperature (e.g. 80 degrees Celsius) and at or below the second predetermined temperature (e.g. 84 degrees Celsius), the first thermostat 18 opens the cooling water passage connected to the CVT warmer 15 and allows the cooling water to flow into the CVT warmer 15, and the second thermostat 19 closes the cooling water passage connected to the radiator 13 to stop the flow of the cooling water toward the radiator 13.

Accordingly, since the cooling water circulates between the engine 11, the heater core 14, and the CVT warmer 15, the air sent to the vehicle compartment is heated by the heater core 14, and the lubricant is heated by the CVT warmer 15 to warm up the continuously variable transmission 17. At this time, the controller 21 stops power supply to the electric heater 20.

When the temperature of the cooling water has increased to some extent, the engine 11 and the continuously variable transmission 17 are warmed up with heat generated by the engine, and the power consumption by the electric heater 20 is stopped.

When the temperature of the cooling water detected by the water temperature sensor 22 is higher than the second predetermined temperature (e.g. 84 degrees Celsius), the first thermostat 18 opens the cooling water passage connected to the CVT warmer 15 and allows the cooling water to flow into the CVT warmer 15, and the second thermostat 19 opens the cooling water passage connected to the radiator 13 and allows the cooling water to flow into the radiator 13.

Accordingly, the air sent to the vehicle compartment is heated by the heater core 14. Further, since the cooling water dissipates heat in the radiator 13, unnecessary heat can be released to the outside air. At this time, the controller 21 stops power supply to the electric heater 20.

After the warm-up is completed, the engine 11 and the continuously variable transmission 17 are cooled by the cooling water, and the power consumption by the electric heater 20 is stopped.

Figure 3:
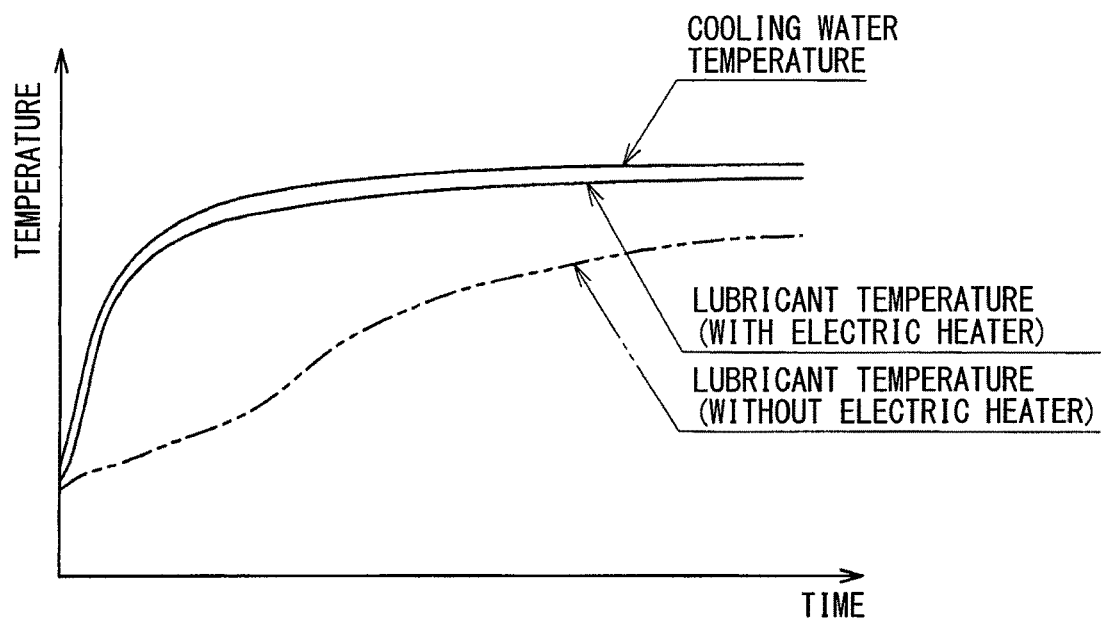
FIG. 3 is a graph showing a temporal change of a temperature of a continuously variable transmission according to at least one embodiment of the present disclosure.

FIG. 3 is a graph showing a temporal change of the temperature of the engine cooling water (i.e. the temperature of the cooling water in the engine cooling water circuit 10) and the temperature of the CVT fluid (i.e. the temperature of the lubricant lubricating the continuously variable transmission 17). A line having alternate long dashes and pairs of short dashes indicates a temporal change of the temperature of the CVT fluid according to a comparative example in which the electric heater 20 is not provided.

In a temperature controller for a transmission according to a comparative example of the present disclosure, the cooling water does not pass through the transmission when the temperature of the cooling water is low, such that the temperature of the cooling water increases preferentially. According to the comparative example, since the cooling water does not pass through the transmission when the temperature of the cooling water is low, the engine is warmed up first, and then the transmission is warmed up to improve the fuel economy. That is, the engine generated heat is optimally distributed to improve the fuel economy. However, according to studies by the present inventors, since the transmission is warmed up later, frictional resistance of the transmission during cold may be large, and the improvement in fuel economy may be limited.

In contrast, according to the configurations of the present disclosure, when the temperature of the engine cooling water is lower than the first predetermined temperature (e.g. 80 degrees Celsius), the temperature of the engine cooling water can be raised quickly by interrupting the flow of the cooling water toward the CVT warmer 15. Since the lubricant in the CVT warmer 15 is heated by the electric heater 20, the temperature of the lubricant for the transmission also can be raised early. Accordingly, since the engine 11 and the continuously variable transmission 17 can be warmed up quickly, friction in the engine 11 and the continuously variable transmission 17 can be reduced, and the fuel economy can be improved.

In the present embodiment, the electric heater 20 is provided to heat the lubricant inside the CVT warmer 15. Therefore, the continuously variable transmission 17 can be warmed up by heating the cooling water with the electric heater 20. Accordingly, friction in the continuously variable transmission 17 is reduced, and the fuel economy can be improved.

In the present embodiment, the electric heater 20 is a heat generation portion that generates heat when electricity is supplied. Accordingly, the lubricant can be heated by the electric heater 20 irrespective of a vehicle travelling condition. Accordingly, the continuously variable transmission 17 can be warmed up quickly.

In the present embodiment, the electric heater 20 is a heat generator that generates heat independently of an actuation of the engine. Accordingly, the lubricant can be heated by the electric heater 20 irrespective of an operation state of the engine 11. Therefore, both the engine 11 and the continuously variable transmission 17 can be warmed up early.

In the present embodiment, the electric heater 20 is provided on the bottom surface 15a of the CVT warmer 15. According to this, since the electric heater 20 can be closer to the heat exchange portion 15h of the CVT warmer 15 compared with a case where the electric heater 20 is provided on the upper surface 15a or the lateral surface 15c, the lubricant inside the CVT warmer 15 can be effectively heated.

In the present embodiment, the controller 21 supplies electric power to the electric heater 20 when the temperature of the cooling water is lower than the first predetermined temperature. The controller 21 stops supplying the electric power to the electric heater 20 when the temperature of the cooling water is at or above the first predetermined temperature. Accordingly, the electric heater 20 is prevented from needlessly heating the lubricant after the continuously variable transmission 17 is warmed up to some extent.

Second Embodiment

Figure 4:
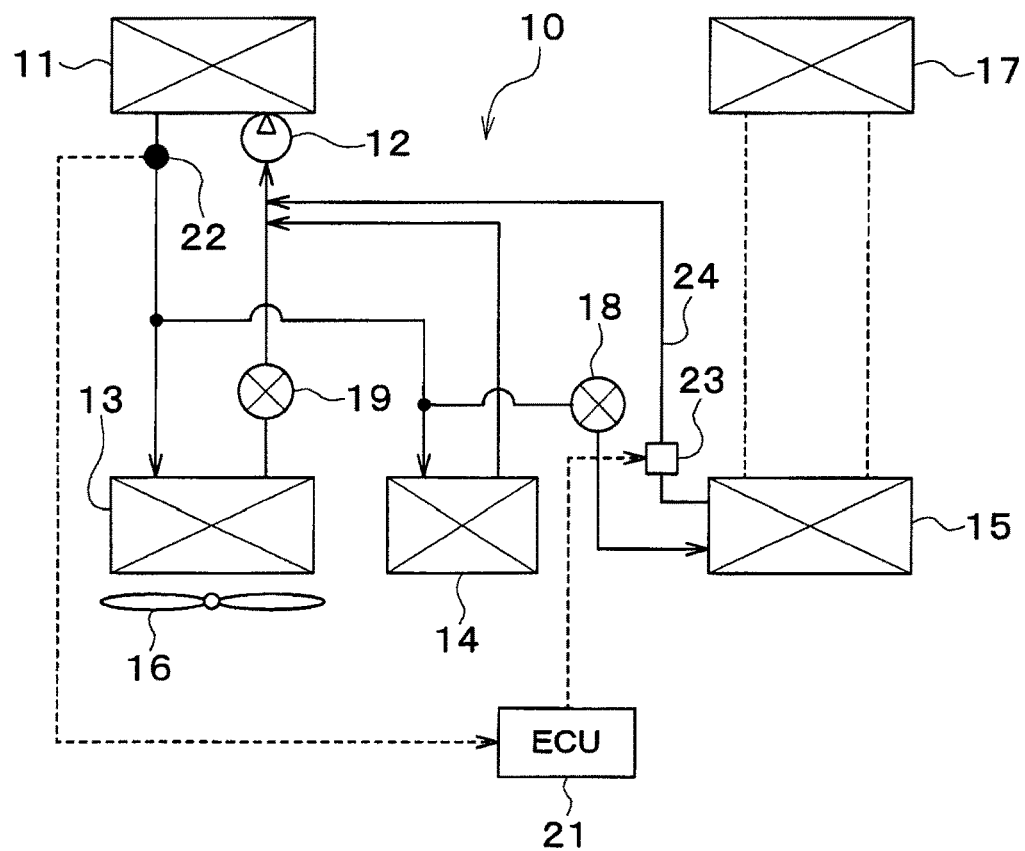
FIG. 4 is a diagram illustrating an overall configuration of a vehicular cooling device according to a second embodiment of at least one embodiment of the present disclosure.

In the above-described embodiment, the electric heater 20 is provided on the bottom surface 15b of the CVT warmer 15. In contrast, in the present embodiment, an electric heater 23 is located in the cooling water passage of the engine cooling water circuit 10 as shown in FIG. 4.

The electric heater 23 of the present embodiment is a glow plug type heater and directly inserted into a hose 24 of the engine cooling water circuit 10. The hose 24 is a pipe member constituting the passage through which the cooling water flows.

The electric heater 23 is located in the cooling water passage connected to the CVT warmer 15 in the engine cooling water circuit 10. Specifically, the electric heater 23 is located in the cooling water passage that is on the outlet side of the CVT warmer 15 and on the inlet side of the engine 11 in the engine cooling water circuit 10.

Next, the operation with the above-described configuration will be described. When the temperature of the cooling water is lower than the first predetermined temperature (e.g. 80 degrees Celsius), the first thermostat 18 opens the cooling passage connected to the CVT warmer 15 and allows the cooling water to flow into the CVT warmer 15, and the second thermostat 19 closes the cooling water passage connected to the radiator 13 to stop a flow of the cooling water toward the radiator 13.

As a result, the cooling water circulates between the engine 11, the heater core 14, and the CVT warmer 15. At this moment, it is preferable that the flow rate of the air passing through the heater core 14 is low. Further, since the cooling water does not flow into the radiator 13, the heat dissipation from the cooling water to the outside air does not occur in the radiator 13.

At this time, the controller 21 causes electric power to be supplied from the battery (not shown) to the electric heater 23. Accordingly, since the cooling water flowing out of the CVT warmer 15 is heated by the electric heater 23, the continuously variable transmission 17 can be warmed up without hindering the warm-up of the engine 11.

That is, since the heat of the cooling water that has heated by the engine 11 is transferred to the lubricant when the cooling water flows through the CVT warmer 15, the continuously variable transmission 17 is warmed up, and the temperature of the cooling water decreases. The electric heater 23 applies heat to the cooling water to raise the temperature of the cooling water again in order to prevent the warm-up of the engine 11 from being hindered by returning the cooling water whose temperature has decreased to the engine 11. Accordingly, the continuously variable transmission 17 can be warmed up without disturbing the warm-up of the engine 11.

At this time, the engine controller (not shown) controls the rotational speed of the engine 11 to be high so as to quickly warm up the engine 11. Therefore, the power generation amount of the alternator (not shown) increases. Accordingly, when the electric power from the battery is insufficient, the electric power generated by the alternator can be supplied to the electric heater 23.

When the temperature of the cooling water detected by the water temperature sensor 22 is at or above the first predetermined temperature (e.g. 80 degrees Celsius) and at or below the second predetermined temperature, the first thermostat 18 opens the cooling water passage connected to the CVT warmer 15 and allows the cooling water to flow into the CVT warmer 15, and the second thermostat 19 closes the cooling water passage connected to the radiator 13 to stop the flow of the cooling water toward the radiator 13.

Accordingly, the air sent to the vehicle compartment is heated by the heater core 14, and the lubricant is heated by the CVT warmer 15 to warm up the continuously variable transmission 17. At this time, the controller 21 stops power supply to the electric heater 23.

When the temperature of the cooling water has increased to some extent, the engine 11 and the continuously variable transmission 17 are warmed up with heat generated by the engine, and the power consumption by the electric heater 23 is stopped.

When the temperature of the cooling water detected by the water temperature sensor 22 is higher than the second predetermined temperature (e.g. 84 degrees Celsius), the first thermostat 18 opens the cooling water passage connected to the CVT warmer 15 and allows the cooling water to flow into the CVT warmer 15, and the second thermostat 19 opens the cooling water passage connected to the radiator 13 and allows the cooling water to flow into the radiator 13.

Accordingly, the air sent to the vehicle compartment is heated by the heater core 14. Further, since the cooling water dissipates heat in the radiator 13, unnecessary heat can be released to the outside air. At this time, the controller 21 stops power supply to the electric heater 23.

After the warm-up is completed, the engine 11 and the continuously variable transmission 17 are cooled by the cooling water, and the power consumption by the electric heater 23 is stopped.

In the present embodiment, the electric heater 23 is inserted into the hose 24 of the engine cooling water circuit 10 and heats the lubricant inside the continuously variable transmission 17 through the cooling water. As such, similar effects to the first embodiment are achieved.

The above-described embodiments can be appropriately combined with each other. The above-described embodiments can be variously modified as follows, for example.

In the above-described embodiments, the CVT warmer 15 is provided in the engine cooling water circuit 10. However, instead of the CVT warmer 15, a heat exchanger that exchanges heat between a lubricant for different type transmission (i.e. transmission fluid) and the cooling water may be used.

In the above-described embodiments, the first thermostat 18 and the second thermostat 19 are provided in the engine cooling water circuit 10. However, electromagnetic valves may be used instead of the first thermostat 18 and the second thermostat 19. The controller 21 may open and close the electromagnetic valves based on the temperature of the cooling water detected by the water temperature sensor 22.

In the second embodiment, the electric heater 23 is located in the cooling water passage that is on the outlet side of the CVT warmer 15 and on the inlet side of the engine 11 in the engine cooling water circuit 10. However, the electric heater 23 may be located in the cooling water passage that is on the outlet side of the engine 11 and on the inlet side of the CVT warmer 15 in the engine cooling water circuit 10.

Although the present disclosure has been described in accordance with the embodiments, it is understood that the present disclosure is not limited to the embodiments and structures disclosed therein. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:
1. A vehicular cooling device comprising:
a heat medium circuit in which a heat medium circulates;
a waste heat supply device configured to generate a waste heat in accordance with operation of the waste heat supply device and supply the waste heat to the heat medium;

a heat exchanger configured to exchange heat between the heat medium and a lubricant lubricating a transmission of a vehicle; and a heater configured to heat the lubricant that is inside the heat exchanger, wherein the heat exchanger includes a lubricant port surface through which the lubricant flows in and out of the heat exchanger, a heat medium port surface through which the heat medium flows in and out of the heat exchanger, a non-port surface that is a surface different from the lubricant port surface and the heat medium port surface, and a heat exchange portion configured to exchange heat between the lubricant and the heat medium, the heat exchange portion is located inside the heat exchanger and closer to the non-port surface than to the lubricant port surface and the heat medium port surface, and the heater is provided on the non-port surface.

2. The vehicular cooling device according to claim 1, wherein the heater is a heat generator that generates heat by receiving a supply of electric power.

3. The vehicular cooling device according to claim 1, wherein the waste heat supply device is an engine, and the heater is configured to generate heat independently of the operation of the engine.

4. The vehicular cooling device according to claim 2, further comprising:

a controller configured to provide the supply of the electric power to the heater when a temperature of the heat medium is lower than a predetermined temperature, and stop the supply of the electric power to the heater when the temperature of the heat medium is at or above the predetermined temperature.

5. The vehicular cooling device according to claim 1, wherein the heater is in contact with an entire area of the non-port surface.

6. A vehicular cooling device comprising:

a heat medium circuit in which a heat medium circulates;

a vehicle component configured to generate a waste heat in accordance with operation of the vehicle component and supply the waste heat to the heat medium;

a heat exchanger configured to exchange heat between the heat medium and a lubricant lubricating a transmission of a vehicle; and a heater configured to heat the lubricant that is inside the heat exchanger, wherein the heat exchanger includes a lubricant port surface through which the lubricant flows in and out of the heat exchanger, a heat medium port surface through which the heat medium flows in and out of the heat exchanger, a non-port surface that is a surface different from the lubricant port surface and the heat medium port surface, and a heat exchange portion configured to exchange heat between the lubricant and the heat medium, the heat exchange portion is located inside the heat exchanger and closer to the non-port surface than to the lubricant port surface and the heat medium port surface, and the heater is provided on the non-port surface.

* * * * *